United States Patent [19]

Nakasugi

[11] Patent Number: 5,532,729
[45] Date of Patent: Jul. 2, 1996

[54] SCANNER MOTOR WITH CERAMIC SLEEVE BEARING

[75] Inventor: Mikio Nakasugi, Chofu, Japan

[73] Assignee: Canon Kabushiki Kaisha, Tokyo, Japan

[21] Appl. No.: 92,991

[22] Filed: Jul. 19, 1993

[30] Foreign Application Priority Data

Jul. 31, 1992 [JP] Japan ................................. 4-224602

[51] Int. Cl.$^6$ ................................................. B41J 2/47
[52] U.S. Cl. ......................... 347/257; 347/260; 382/107
[58] Field of Search ................................. 347/261, 260, 347/257, 259; 384/114, 100, 107, 121

[56] References Cited

U.S. PATENT DOCUMENTS

| | | |
|---|---|---|
| 3,121,179 | 2/1964 | Macks . |
| 4,726,640 | 2/1988 | Iwama et al. . |
| 5,018,881 | 5/1991 | Asada . |
| 5,019,738 | 5/1991 | Weilbach et al. . |
| 5,097,164 | 3/1992 | Nakasugi et al. . |
| 5,141,338 | 8/1992 | Asada et al. ............................. 384/114 |
| 5,144,339 | 9/1992 | Ohashi et al. ........................... 347/261 |
| 5,181,783 | 1/1993 | Sherman et al. ........................ 384/114 |
| 5,270,737 | 12/1993 | Nakasugi et al. ....................... 347/260 |

FOREIGN PATENT DOCUMENTS 0229911  7/1987  European Pat. Off. .

*Primary Examiner*—Mark J. Reinhart
*Attorney, Agent, or Firm*—Fitzpatrick, Cella, Harper & Scinto

[57] ABSTRACT

A scanning motor includes a fixed shaft made of a ceramic material. The rotary sleeve is rotatably fitted onto the material, and a rotary sleeve also made of a ceramic fixed shaft so as to be rotatable about the fixed shaft. The motor further includes a thrust plate fixed to one end portion of the rotary sleeve. At least an abutting surface of the thrust plate faces an end surface of the fixed shaft. The motor further includes a driver for rotating the fixed sleeve. At least one of the end surface of the fixed shaft and the abutting surface of the thrust plate has the shape of at least a part of the surface of a sphere. A fixing member, made of a metal material, can be fixed around the rotary sleeve and a rotary polygonal mirror and a driving magnet can be fixed to the fixing member. During high speed rotation, the rotary sleeve is supported by the fixed shaft under a non-contact condition in the radial direction due to a film of air produced on the fitting surface therebetween, and under a point-contact condition in the thrust direction. As a result, power consumption is small even when the rotating polygonal mirror is rotated at a high speed and the biting phenomenon due to the invasion of dust and vibration is hardly present. Thus, precision high speed rotation can be maintained.

16 Claims, 4 Drawing Sheets

SCANNER MOTOR WITH CERAMIC SLEEVE BEARING

BACKGROUND OF THE INVENTION

1. Field of the Invention

The present invention relates to a scanner motor which is applicable, for example, to a driving mechanism of a rotary polygonal mirror for scanning a photosensitive body with a laser beam or the like in a recording apparatus, such as a laser beam printer.

2. Related Background Art

In recent years, a rotating apparatus, which achieves a high-speed or high-precision rotation for driving a rotary polygonal mirror, is needed in a laser beam printer and the like. Particularly, a bearing for achieving a non-contact rotation is used to obtain a high-precision deflective scanning apparatus.

FIG. 1 shows a scanner which uses a dynamic pressure fluid bearing, i.e., a kind of non-contact bearing, and which is usable in a deflective scanning apparatus, such as a laser beam printer. In the apparatus of FIG. 1, a rotary shaft 1 is rotatably fitted into a sleeve 2. To a lower portion of the sleeve 2, a thrust plate 3 is fixed together with a fixing plate 4, and thus the sleeve 2 is fixed to an outer cylinder 5 connected to fixing plate 4.

A flange 6 is fixed to the rotary shaft 1. A rotary polygonal mirror 7 is then fixed to an upper portion of the flange 6, and a yoke 9 with a driving magnet 8 fixed thereto is fixed to a lower portion of the flange 6. A stator 10 is fixed to the outer cylinder 5 in a state in which the stator 10 faces the driving magnet 8. Thus, a driving motor is constructed.

A shallow groove 11 is formed on a surface of the thrust plate 3 facing an end portion of the rotary shaft 1, and thus a dynamic pressure thrust bearing is built. Herringbone shallow grooves 14 and 14' are formed on two portions of an outer peripheral surface of the rotary shaft 1 facing an inner peripheral surface of the sleeve 2. Further, a spiral shallow groove 15 is formed on the outer peripheral surface of the rotary shaft 1 to facilitate the flow of lubricating fluid in the dynamic pressure thrust bearing. On the inner surface of the sleeve 2, a recess portion 16 is formed between the herringbone shallow groove 14 and the spiral shallow groove 15, and a small-diameter hole 17 is formed in the sleeve 2. Thus, the stability of the lubricating fluid flow is assured.

Further, a relief portion 18 is formed between the two herringbone shallow grooves 14 and 14', and another relief portion 19 is formed between the lower herringbone shallow groove 14' and the dynamic pressure thrust bearing portion. Thus, the reduction of the fluid bearing portion is minimized.

Recently, a bearing apparatus using a ceramic material and the like has been developed.

In such bearings, however, the following technical disadvantages exist which diminish the accomplishment of a high-speed and high-precision deflective scanning apparatus.

First, in dynamic pressure bearings using liquid, such as oil and grease as the fluid, the viscosity resistance of the fluid and, hence, the torque loss increases as the speed increases, and thus heat generation and power consumption increase.

Second, in dynamic pressure fluid bearings using gas, such as air, as the fluid, the bearing is vulnerable to the invasion of dust and moisture and, hence, it difficult to handle. Further, the so-called biting phenomenon is likely to occur when there is a contact between members due to vibrations and the like, when a high-speed rotation is conducted.

Third, in bearings using a ceramic material in a portion thereof, precision decreases when a change in temperature and the like occurs, even if a rotary polygonal mirror and so forth are initially assembled precisely, since the rates of thermal expansion of the different materials are substantially different from each other.

SUMMARY OF THE INVENTION

It is an object of the present invention to provide a scanner motor in which the amount of power consumption is small even at the time of a high-speed rotation, the biting phenomenon due to the invasion of dust and the like and vibrations hardly occurs and a high precision can be maintained substantially permanently.

According to one aspect, the present invention, which achieves these objectives relates to a scanner motor comprising a fixed shaft made of a ceramic material, and a rotary sleeve made of a ceramic material. The rotary shaft is rotatably fitted onto the fixed shaft so as to be rotatable around the fixed shaft. The motor also comprises a thrust plate fixed to one end portion of the rotary sleeve. At least an abutting surface of the thrust plate faces an end surface of the fixed shaft. The motor further comprises driving means for driving the rotary sleeve. At least one of the end surface of the fixed shaft and the abutting surface of the thrust plate has the shape of at least a part of the surface of a sphere. Alternatively, the thrust plate is made of a metal material, and the motor further comprises a spherical member made of a ceramic material and provided on the abutting surface of the thrust plate.

According to another aspect, the present invention which achieves these objectives relates to a light deflecting apparatus for deflecting a light beam. The apparatus comprises a fixed shaft made of a ceramic material and a rotary sleeve made of a ceramic material. The rotary sleeve is rotatably fitted onto the fixed shaft so as to be rotatable around the fixed shaft. The apparatus further comprises a deflector for deflecting a light beam, the deflector being mounted to the rotary sleeve, and a thrust plate fixed to one end portion of the rotary sleeve. At least an abutting surface of the thrust plate faces an end surface of the fixed shaft. The apparatus further comprises driving means for rotating the rotary sleeve. At least one of the end surface of the fixed shaft and the abutting surface of the thrust plate has the shape of at least a part of the surface of a sphere. Alternatively, the thrust plate is made of a metal material, and the motor further comprises a spherical member made of a ceramic material and provided on the abutting surface of the thrust plate.

According to still another aspect, the present invention which achieves these objectives relates to a laser beam printer apparatus comprising a light source, a fixed shaft made of a ceramic material, and a rotary sleeve made of a ceramic material. The rotary sleeve is rotatably fitted onto the fixed shaft so as to be rotatable around the fixed shaft. The apparatus further comprises a deflector for deflecting a light beam from the light source, the deflector being mounted on the rotary sleeve, a photosensitive body for receiving the light beam deflected by the deflector, and a thrust plate fixed to one end portion of the rotary sleeve. At least an abutting surface of the thrust plate faces an end surface of the fixed shaft. The apparatus further comprises driving means for rotating the rotary sleeve. At least one of the end surface of the fixed shaft and the abutting surface of the thrust plate has the shape of at least a part of the surface of a sphere. Alternatively, the thrust plate is made of a metal material, and the motor further comprises a spherical member made of a ceramic material and provided on the abutting surface of the thrust plate.

In addition, the motor noted above can comprise a metal member fixed to an outer periphery of the rotary sleeve, and a deflector mounted on the metal member. In all of the apparatus and the motor noted above, an annular groove can be formed on an outer peripheral surface of the fixed shaft at a central portion of a fitting portion between the fixed shaft and the rotary sleeve. Moreover, the ceramic material of the fixed shaft, the rotary sleeve, and the thrust plate can be silicon nitride. In addition, the fixed shaft and the rotary sleeve lack a dynamic pressure generating groove.

In the scanner motor mentioned immediately above, an air film is produced on a fitting surface of the rotary sleeve facing the fixed shaft when the rotary sleeve, to which the rotary polygonal mirror (i.e., the deflector) is fixed, is rotated. Therefore, the rotary sleeve is supported in a complete non-contact state in the radial direction, and the thrust plate fixed to the rotary sleeve is supported by the fixed shaft in a point-contact state in a thrust direction.

These advantages and others will be more readily understood in connection with the following detailed description of the preferred embodiments in conjunction with the drawings.

DESCRIPTION OF THE PREFERRED EMBODIMENT

Embodiments of the present invention will be described with reference to FIGS. 2 to 5.

Figure 1:
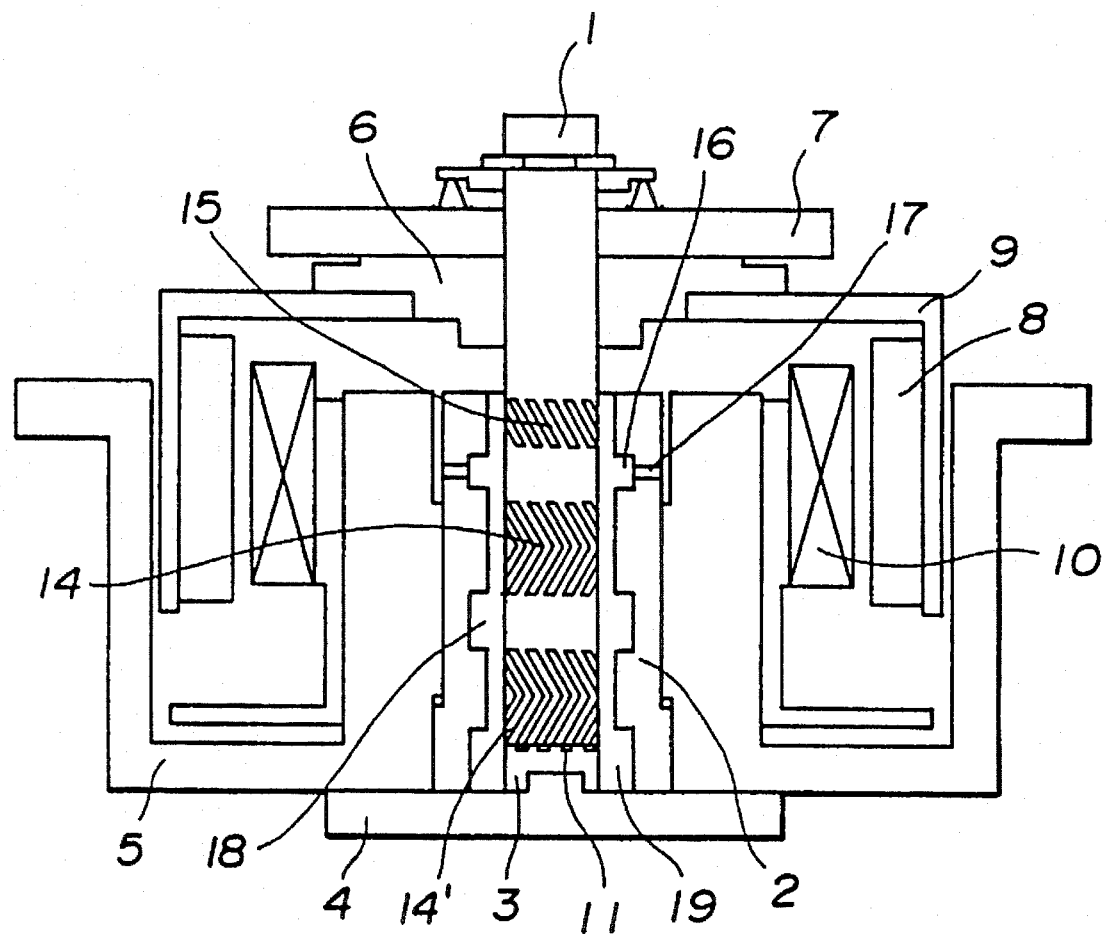
FIG. 1 is a cross-sectional view of a conventional scanner motor.
Figure 2:
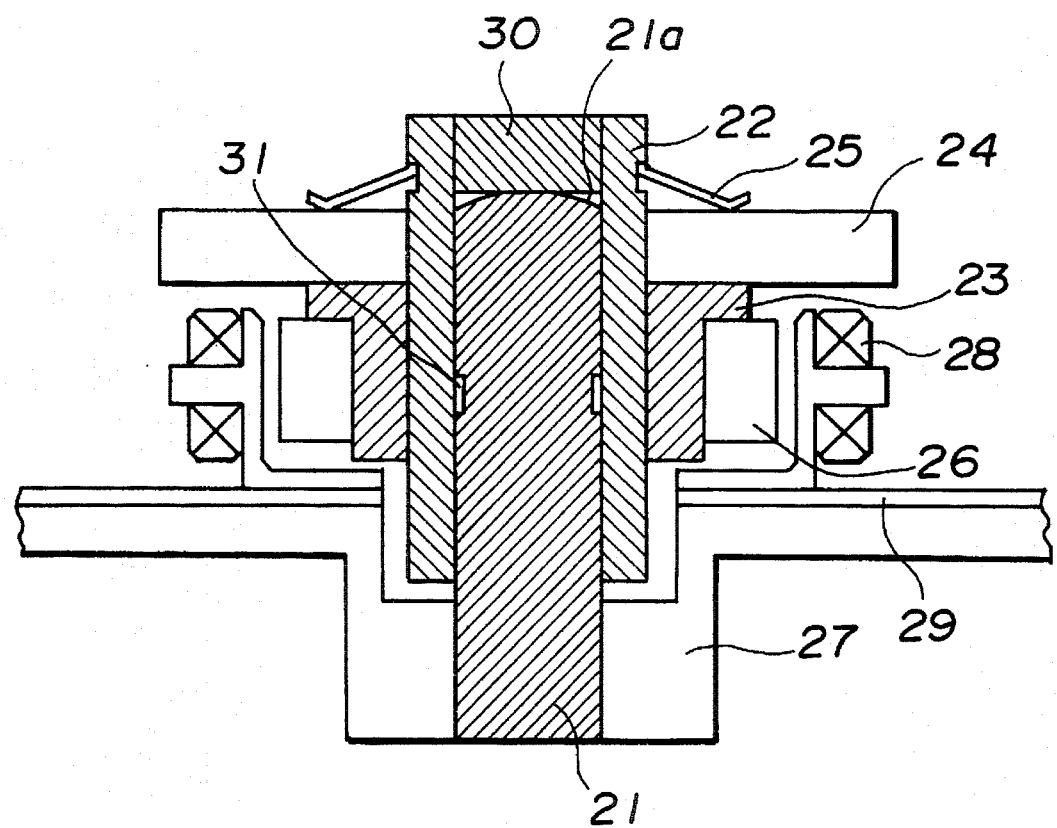
FIG. 2 is a cross-sectional view of a first embodiment of a scanner motor according to the present invention.
Figure 3:
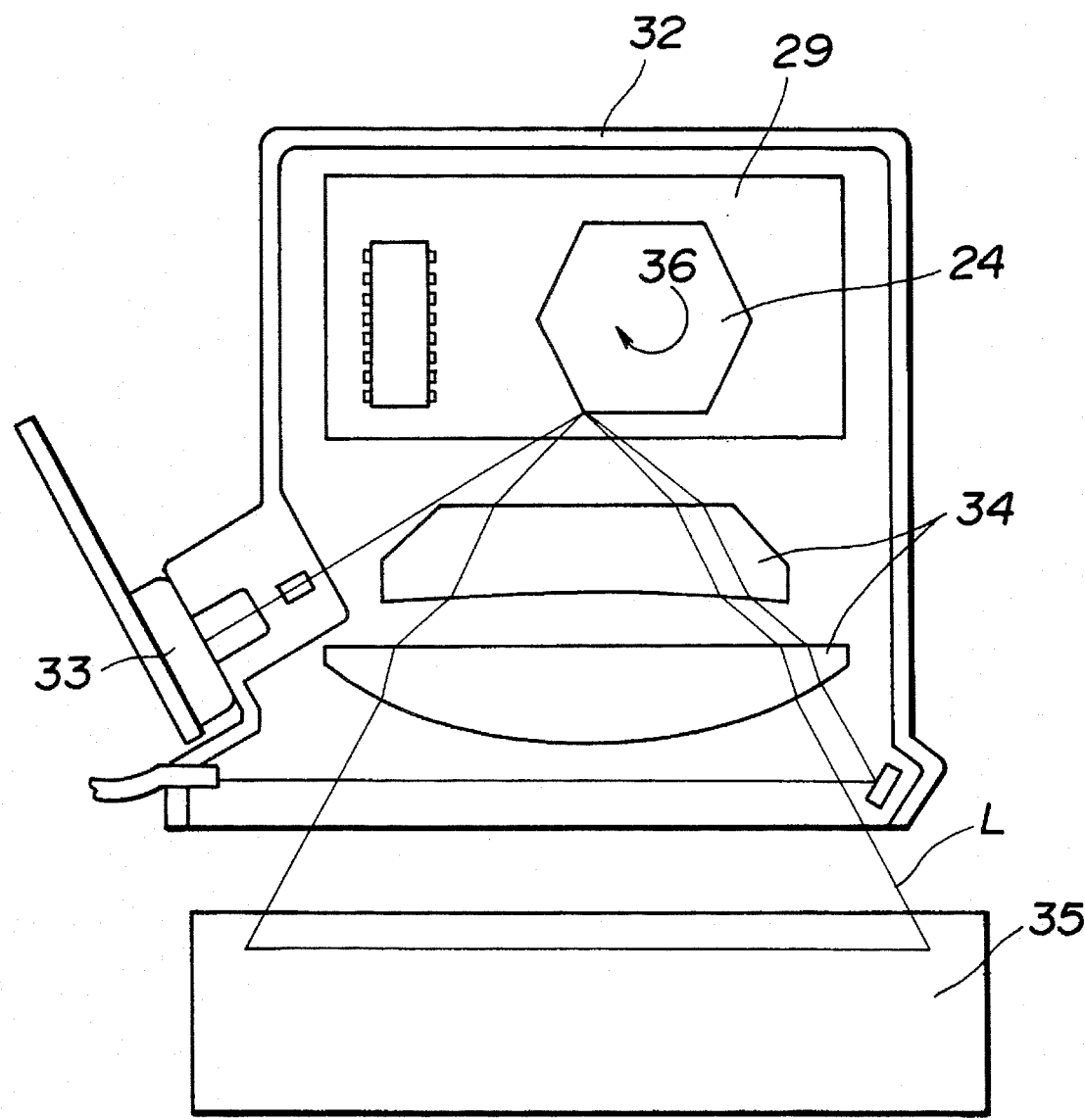
FIG. 3 is a schematic plan view showing the entire structure of a deflective scanning apparatus.

FIG. 2 shows a bearing portion of a rotary polygonal mirror in a first embodiment of a scanner motor, and FIG. 3 shows the entire structure of a deflective scanning apparatus. In FIG. 2, reference numeral 21 designates a fixed shaft whose upper end surface 21a has the shape of at least part of the surface of a sphere, reference numeral 22 designates a rotary sleeve rotatably fitted onto the fixed shaft 21. Members 21 and 22 are made of a ceramic material. To the outer peripheral surface of the rotary sleeve 22, a fixing member 23, which is made of, for example, aluminum, brass or the like, is fixed by a conventional method such as a shrinkage fit. A rotary polygonal mirror or deflector 24 is pushed against the fixing member 23 by a leaf spring 25 and fixed thereto. Further, a driving magnet 26 is fixed to the fixing member 23 by a conventional method, such as adhesion.

The fixed shaft 21 is fixed to a motor housing 27. A stator 28 and a motor substrate 29, on which electrical components are arranged, are disposed at a portion of the motor housing 27, facing the driving magnet 26, and thus a driving motor for rotating the rotary polygonal mirror 24 is constructed. Further, a thrust plate 30 made of a ceramic material is fitted into and fixed to the upper end portion of the rotary sleeve 22, and the spherical end surface 21a of the fixed shaft 21 is in contact with the thrust plate 30. It is necessary to bring the thrust plate 30 into point-contact with the fixed shaft 21, and means other than the spherical end surface 21a can be used therefor, as described below. An annular groove 31 is formed on a central portion of the fixed shaft 21 which is fitted into the rotary sleeve 22.

When the rotary sleeve 22 is rotated by a driving motor, an air film is created between the fixed shaft 21 and the rotating rotary sleeve 22 fitted thereonto even if there is no dynamic pressure generating groove formed on the fixed shaft 21. Thus, the rotary sleeve 22 is supported under a non-contact condition in the radial direction. On the other hand, the thrust plate 30 is supported by the fixed shaft 21 under a point-contact condition in the thrust direction. The rotary polygonal mirror 24 is rotated along with the rotary sleeve 22 by the driving motor. As shown in FIG. 3, a laser beam L, emitted from a laser unit 33 mounted to an optical box 32, is deflected by the rotary polygonal mirror 24, condensed by a lens group 34 and deflectively scans a photosensitive body 35 which is a recording medium.

A main scanning operation is performed by the light beam on the photosensitive body 35 when the rotary polygonal mirror 24 is rotated in a direction of arrow 36. A sub-scanning operation is performed by rotating the cylindrical photosensitive body 35 about a center axis thereof. Thus, an electrostatic latent image is formed on a surface of the photosensitive body 35.

Around the photosensitive body 35, there are arranged a corona discharger for uniformly charging the surface of the photosensitive body 35, a developing device for converting the electrostatic latent image formed on the surface of the photosensitive body 35 into an explicit image or toner image, a transfer corona discharger for transferring the toner image onto a recording paper and the like (all are not shown in FIG. 3). Due to functioning of those devices, recording information corresponding to the laser beam generated by a light source in the laser unit 33 is printed onto the recording paper.

In the above-discussed structure, the rotating and fixed sides of the scanner motor are in a complete non-contact state in the radial direction, and are in a point-contact state in the thrust direction. Therefore, even when a high-speed rotation is conducted, the increase in the torque loss is small, heat generation is reduced, and the increase in power consumption is small. Further, since the thrust plate 30 and the fixed shaft 21 are made of a ceramic material, the coefficient of friction therebetween is so small that any loss due to friction is small and only a small amount of wear is caused even during a high-speed rotation. Further, since the fixed shaft 21 and the rotary sleeve 22 are made of a ceramic material, there is little possibility of causing the biting phenomenon, even if the invasion of dust occurs and there is contact therebetween due to vibrations during a high-speed rotation. In particular, when highly strong silicon nitride ($Si_3N_4$) is used as the ceramic material for the fixed shaft 21, rotary sleeve 22 and thrust plate 30, the possibilities of causing wear and biting phenomenon become drastically reduced since the wear resistance and strength of such ceramic material are excellent.

Further, the fixing member 23, composed of a metal material, is fixed onto the outer periphery of the rotary sleeve 22, and the rotary polygonal mirror 24 and driving magnet 26, made of a metal material, are fixed to this fixing member 23, and hence precision degradation due to a difference in the rate of thermal expansion is minimal. Moreover, since the shape of the rotary sleeve 22, made of a ceramic material, is simplified and no machining for a dynamic pressure generating groove is needed, high-precision machining is facilitated and its cost can be reduced.

Since the fixing member 23, fixed to the outer periphery of the rotary sleeve 22, is made of a metal material, its machining is easy to perform and the driving magnet 26 can be mounted to a desired position. In addition, its machining precision can be increased in the following manner.

The center of gravity of a rotational body can be selected to a certain extent by changing the shape of the fixing member 23, and can be set in the vicinity of a center of the bearing portion which is an ideal position.

An annular groove 31 is formed on the outer peripheral surface of the fixed shaft 21 in the vicinity of a fitting portion between the fixed shaft 21 and the rotary sleeve 22 and is made of a ceramic material, so that an air film is produced at two locations between the fixed shaft 21 and the rotary sleeve 22 during rotation of rotary sleeve 22. The annular groove 31 has only to be machined prior to sintering the ceramic material, thereby preventing an increase in the machining cost.

No dynamic pressure generating groove is formed in either the fixed shaft 21 or the rotary sleeve 22, so that the fixed shaft 21 and rotary sleeve 22 are readily machinable.

As described in the foregoing, in the scanner motor of this embodiment, the rotary sleeve 22 is rotatably fitted onto the fixed shaft 21, and the thrust plate 30, fixed to one end portion of the rotary sleeve 22, abuts against the end furface 21a of the fixed shaft 21. The fixed shaft 21, rotary sleeve 22 and thrust plate 30 are made of a ceramic material, and the thrust plate 30 is brought into point-contact with the fixed shaft 21 by shaping at least one of them into a spherical surface. The fixing member 23, made of a metal material, is fixed around the rotary sleeve 22, and the rotary polygonal mirror 24 and the driving magnet 26 are fixed to the fixing member 23. During high-speed rotation, the rotary sleeve 22 is supported by the fixed shaft 21 under a non-contact condition in the radial direction due to the air film formed on the fitting surface therebetween, and under a point-contact condition in the thrust direction.

Figure 4:
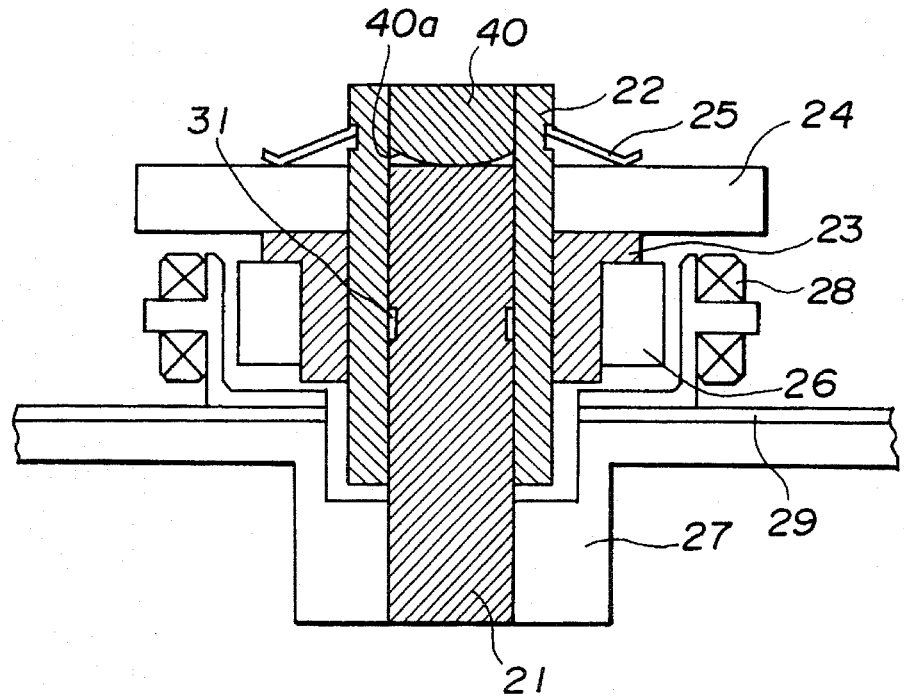
FIG. 4 is a cross-sectional view of a second embodiment of a scanner motor according to the present invention.

FIG. 4 shows a second embodiment of a scanner motor, and the same members as those in FIG. 2 are designated by the same reference numerals. In the second embodiment, a thrust plate 40 fixed to one end or the upper end portion of a rotary sleeve 22 is made of a ceramic material, and an abutting surface 40a of the thrust plate 40 which abuts the end surface of a fixed shaft 21 has the shape of at least part of the surface of a sphere. Also in this case, the thrust plate 40 is in point-contact with the fixed shaft 21.

Thus, the same operation and technical advantages as those of the first embodiment can also be obtained in the second embodiment. Further, since the spherical surface is formed on the thrust plate 40, the length of the fixed shaft 21 in the axial direction can be shortened, and thus its machining becomes easier. Its cost can also be reduced. In principle, it is possible to shape both of the thrust plate 40 and fixed shaft 21 into respective spherical forms.

The second embodiment can also be used in a deflective scanning apparatus as shown in FIG. 3, similar to the first embodiment shown in FIG. 2.

Figure 5:
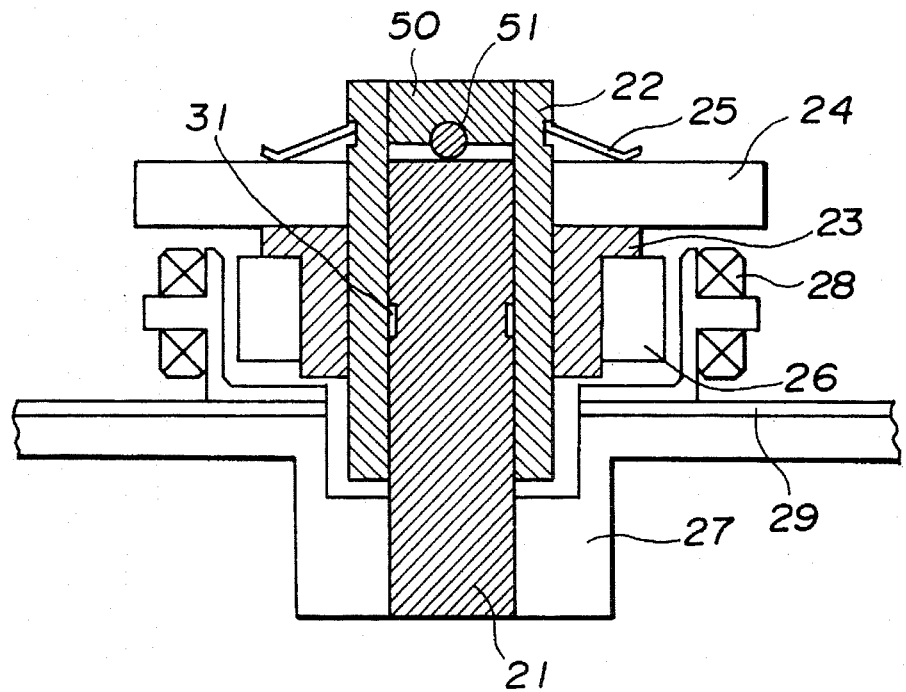
FIG. 5 is a cross-sectional view of a third embodiment of a scanner motor according to the present invention.

A third embodiment will be described. Although the thrust plate is brought into direct contact with the end surface of a fixed shaft 21 in the above embodiments, they can be in indirect contact with each other through a third member 51 made of a ceramic material as shown in FIG. 5 of the third embodiment. In FIG. 5, the same members as those of FIG. 2 are designated by the same reference numerals.

In FIG. 5, a spherical member 51 made of a ceramic material is fitted into and fixed to an abutting surface of a thrust plate 50 facing the end surface of the fixed shaft 21. The thrust plate 50, made of a metal material, is fitted into and fixed to one end portion of a rotary sleeve 22. Thus, the spherical member 51 is in point-contact with the end surface of the fixed shaft 21, made of a ceramic material. In this case, as the spherical member 51 is made of a ceramic material, the thrust plate 50 itself may be composed of an appropriate material such as a metal material and a synthetic resin material. For example, cost can be reduced, when the thrust plate 50 is made of a synthetic resin material and an insert molding thereof is performed together with each ceramic spherical member 51.

Since point-contact is established between the spherical member 51, fixed to the thrust plate 50, and the end surface of the fixed shaft 21, by bringing them into contact with each other, the same operation and technical advantages can be naturally obtained, as to the above-discussed first and second embodiments. The third embodiment is advantageous in that a round shape of the spherical surface in contact with the end surface of the fixed shaft 21 can be desirably selected by changing the diameter of the spherical member 51.

Of course, it is possible to provide the spherical member 51 shown in FIG. 5 at the side of the fixed shaft 21, but in this case the fixed shaft 21, rotary sleeve 22, thrust plate 50 and spherical member 51 need to be formed with a ceramic material.

The third embodiment can also be used in a deflective scanning apparatus as shown in FIG. 3, similar to the first embodiment shown in FIG. 2.

Although the scanner motors of all the above embodiments are of an inner rotor type which are designed for a high-speed rotation, the present invention can be applied to other types of motors, such as an outer rotor type and a face-to-face type.

As described in the foregoing, in a scanner motor of the present invention, a fixed shaft and a rotary sleeve, which are rotatably fitted with each other, are made of a ceramic material, and a thrust plate, at least a contact portion of which faces the fixed shaft, and which is is made of a ceramic material, is fixed to one end of the rotary sleeve. Further, the thrust plate is in point-contact with the end surface of the fixed shaft. As a result, power consumption is small even when a rotary polygonal mirror is rotated at a high speed, and the biting phenomenon due to the invasion of dust and vibrations hardly occurs. Thus, high precision scanning can be maintained.

Except as otherwise disclosed herein, the various components shown in outline or block form in the figures are individually well known in the motor scanner and optical deflecting apparatus arts, and their internal construction and operation are not critical either to the making or using of this invention or to a description of the best mode of the invention.

While the present invention has been described with respect to what is presently considered to be the preferred embodiments, it is to be understood that the invention is not limited to the disclosed embodiments. The present invention is intended to cover various modifications and equivalent arrangements included within the sprit and scope of the appended claims.

What is claimed is:

1. A scanner motor comprising:

a fixed shaft made of a ceramic material;

a rotary sleeve made of a ceramic material, said rotary sleeve being rotatably fitted onto said fixed shaft so as to be rotatable around said fixed shaft;

a thrust plate fixed to one end portion of said rotary sleeve, wherein an abutting surface of said thrust plate faces an end surface of said fixed shaft and is made of a ceramic material; and driving means for rotating said rotary sleeve, wherein at least one of said end surface of said fixed shaft and said abutting surface of said thrust plate has the shape of at least part of the surface of a sphere.

2. A scanner motor according to claim 1, further comrising a metal member fixed to an outer periphery of said rotary sleeve, and a deflector mounted to said metal member.

3. A scanner motor according to claim 1, wherein an annular groove is formed on an outer peripheral surface of said fixed shaft at a central portion of a fitting portion between said fixed shaft and said rotary sleeve.

4. A scanner motor according to claim 1, wherein the ceramic material of said fixed shaft, said rotary sleeve and said thrust plate is silicon nitride.

5. A scanner motor according to claim 1, wherein said fixed shaft and said rotary sleeve lack a dynamic pressure generating groove.

6. A scanner motor comprising:

a fixed shaft made of a ceramic material;

a rotary sleeve made of a ceramic material, said rotary sleeve being rotatably fitted onto said fixed shaft so as to be rotatable around said fixed shaft;

a thrust plate fixed to one end portion of said rotary sleeve, wherein at least an abutting surface of said thrust plate faces an end surface of said fixed shaft;

driving means for rotating said rotary sleeve; and a spherical member made of a ceramic material, said spherical member being provided on said abutting surface of said thrust plate.

7. A light deflecting apparatus for deflecting a light beam, said apparatus comprising:

a fixed shaft made of a ceramic material;

a rotary sleeve made of ceramic material, said rotary sleeve being rotatably fitted onto said fixed shaft so as to be rotatable around said fixed shaft;

a deflector for deflecting a light beam, said deflector being mounted to said rotary sleeve;

a thrust plate fixed to one end portion of said rotary sleeve, wherein an abutting surface of said thrust plate faces an end surface of said fixed shaft and is made of a ceramic material; and driving means for rotating said rotary sleeve, wherein at least one of said end surface of said fixed shaft and said abutting surface of said thrust plate have the shape of at least part of the surface of a sphere.

8. A light deflecting apparatus according to claim 7, wherein an annular groove is formed on an outer peripheral surface of said fixed shaft at a central portion of a fitting portion between said fixed shaft and said rotary sleeve.

9. A light deflecting apparatus according to claim 7, wherein the ceramic material of said fixed shaft, said rotary sleeve, and said thrust plate is silicon nitride.

10. A light deflecting apparatus according to claim 7, wherein said fixed shaft and said rotary sleeve lack a dynamic pressure generating groove.

11. A light deflecting apparatus for deflecting a light beam, said apparatus comprising:

a fixed shaft made of a ceramic material;

a rotary sleeve made of a ceramic material, said rotary sleeve being rotatably fitted onto said fixed shaft so as to be rotatable around said fixed shaft;

a deflector for deflecting a light beam, said deflector being mounted to said rotary sleeve;

a thrust plate fixed to one end portion of said rotary sleeve, wherein said thrust plate is made of a metal material, wherein at least an abutting surface of said thrust plate faces an end surface of said fixed shaft; and driving means for rotating said rotary sleeve; and a spherical member made of a ceramic material, said spherical member being provided on said abutting surface of said thrust plate.

12. A laser beam printer apparatus comprising:

a light source;

a fixed shaft made of a ceramic material;

a rotary sleeve made of a ceramic material, said rotary sleeve being rotatably fitted onto said fixed shaft so as to be rotatable around said fixed shaft;

a deflector for deflecting a light beam from said light source, said deflector being mounted on said rotary sleeve;

a photosensitive body for receiving the light beam deflected by said deflector;

a thrust plate fixed to one end portion of said rotary sleeve, wherein an abutting surface of said thrust plate faces an end surface of said fixed shaft and is made of a ceramic material; and driving means for rotating said rotary sleeve, wherein at least one of said end surface of said fixed shaft and said abutting surface of said thrust plate has the shape of at least part of the surface of a sphere.

13. A laser beam printer apparatus according to claim 12, wherein an annular groove is formed on an outer peripheral surface of said shaft at a central portion of a fitting portion between said fixed shaft and said rotary sleeve.

14. A laser beam printer apparatus according to claim 12, wherein the ceramic material of said fixed shaft, said rotary sleeve and said thrust plate is silicon nitride.

15. A laser beam printer apparatus according to claim 12, wherein said fixed shaft and said rotary sleeve lack a dynamic pressure generating groove.

16. A laser beam printer apparatus comprising:

a light source;

a fixed shaft made of a ceramic material;

a rotary sleeve made of a ceramic material, said rotary sleeve being rotatably fitted onto said fixed shaft so as to be rotatable around said fixed shaft;

a deflector for deflecting a light beam from said light source, said deflector being mounted on said rotary sleeve;

a photosensitive body for receiving the light beam deflected by said deflector;

a thrust plate fixed to one end portion of said rotary sleeve, wherein at least an abutting surface of said thrust plate faces an end surface of said fixed shaft;

driving means for rotating said rotary sleeve; and a spherical member made of a ceramic material, said spherical member being provided on said abutting surface of said thrust plate.

* * * * *

UNITED STATES PATENT AND TRADEMARK OFFICE
CERTIFICATE OF CORRECTION

PATENT NO. : 5,532,729
DATED : July 2, 1996
INVENTOR(S) : MIKIO NAKASUGI

It is certified that error appears in the above-indentified patent and that said Letters Patent is hereby corrected as shown below:

ON THE COVER PAGE

ABSTRACT

Line 2, "the" should read --the ceramic--.

COLUMN 1

Line 66, "it" should read --is--.

COLUMN 2

Line 33, "provided" should read --is provided--.
Line 53, "provided" should read --is provided--.

COLUMN 3

Line 6, "provided" should read --is provided--.

UNITED STATES PATENT AND TRADEMARK OFFICE
CERTIFICATE OF CORRECTION

PATENT NO. : 5,532,729
DATED : July 2, 1996
INVENTOR(S) : MIKIO NAKASUGI

It is certified that error appears in the above-indentified patent and that said Letters Patent is hereby corrected as shown below:

<u>COLUMN 7</u>

Line 17, "comris-" should read --compris- --.

Signed and Sealed this

Twenty-ninth Day of October 1996

Attest:

BRUCE LEHMAN

*Attesting Officer*        *Commissioner of Patents and Trademarks*